United States Patent Office 3,780,114
Patented Dec. 18, 1973

3,780,114
METHOD FOR THE PREPARATION OF
1,2,4,5-TETRAHYDROXYBENZENE
Sylvain Achiel Raoul Dewaele, Evergem, Belgium, assignor to S.A. Texaco Belgium N.V., Brussels, Belgium
No Drawing. Filed Nov. 23, 1970, Ser. No. 92,139
Int. Cl. C07c 37/06
U.S. Cl. 260—621 H
4 Claims

ABSTRACT OF THE DISCLOSURE 1,2,4,5-tetrahydroxybenzene is prepared by the catalytic hydrogenation of 2,5-dihydroxy-p-benzoquinone over a hydrogenation catalyst in a mutual solvent in yields of 70 to 90 mole percent. The starting material is readily prepared from hydroquinone. The final product finds utility, e.g. as a dispersant.

This invention relates to compositions of matter classified in the art of chemistry as tetrafunctional benzene derivatives and to methods for making such compositions. More specifically, the invention is directed to a process for making 1,2,4,5-tetrahydroxy benzene.

Previous syntheses of 1,2,4,5-tetrahydroxybenzene have included the chemical reduction of 2,5-dihydroxy-1,4-benzoquinone [R. Nietzki et al., Ber. Dtsch. Chem. Ges. 21, 2374 (1888); W. K. Anslow et al., J. Chem. Soc. 1939 (1446)] and its catalytic hydrogenation [J. Pospisil et al., Coll. Czech. Chem. Comm. 24, 729 (1959); Chem. Listy, 52, 939 (1958)]. It has been found, however, that reduction of 2,5-dihydroxy-1,4-benzoquinone with sodium sulfite in hydrochloric acid gives only a dark brown oil. Similarly, catalytic hydrogenation of this starting compound in ethanol with Raney nickel catalyst gives only a black solid or a dark oil. Hydrogenation of the starting material in methanol with $PtO_2$ as the catalyst (according to the Pospisil et al. article, supra) has given an impure, grey solid product containing black particles, the yield varying from 29 to 79 percent. 1,2,4,5-tetrahydroxybenzene is extremely sensitive to oxidizing conditions, in particular in solution with the consequence that pure samples thereof were not really obtainable by prior art method.

The process of this invention is free of the above-enumerated drawbacks of prior art techniques and gives the desired product in highly purified form in good yields starting with a 2,5-dihydroxy-1,4-benzoquinone which is hydrogenated in the presence of a hydrogenation catalyst such as a noble metal catalyst, a nickel catalyst and oxides thereof. The hydrogenation is carried out in a reaction medium in which both the starting material and the final product are soluble and from which the final product can be isolated in pure form.

The 2,5-dihydroxy-1,4-benzoquinone starting material can be prepared according to a modification of the general procedure of R. G. Jones et al., J. Am. Chem. Soc. 67, 1034 (1945) which involves oxidizing a finely divided hydroquinone with hydrogen peroxide in 50 percent sodium hydroxide using effective stirring and a constant temperature. The product is acidified with HCl and then dissolved in acetone or tetrahydrofuran to remove sodium chloride therefrom. The yield is from 84 to 100%. The reaction is illustrated as follows:

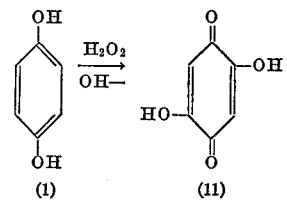

According to a preferred embodiment of the invention the above described 2,5-dihydroxy-1,4-benzoquinone is hydrogenated in tetrahydrofuran using $PtO_2$ catalyst. This hydrogenation proceeds as follows:

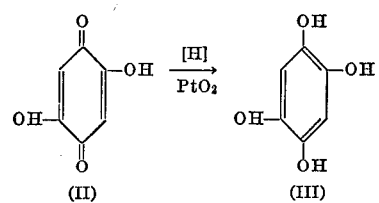

The amount of catalyst used is at least 0.01 percent of the starting material. Hydrogen absorption by the starting material is very rapid in solution and is evidenced by the reaction medium, changing in color from orange brown to slightly yellow. The preferred solvent is tetrahydrofuran but other solvents such as dioxane can be used. The amount of solvent used should be about 2 liters per 50 grams of starting material but the amount can be halved by using a solvent mixture containing 10% methanol such as a mixture of 90% of tetrahydrofuran and 10% methanol. The reaction is carried out at room temperature and at atmospheric pressure.

After decanting the solution from the catalyst, about half of the solvent is distilled off in the absence of air, preferably under a nitrogen atmosphere. After cooling, also in the absence of air, large shaped white crystals separate which contain between 50 and 60 percent of tetrahydrofuran (2 to 3 moles of tetrahydrofuran per mole of III). The crystals then are filtered off. Upon heating the crystals under reduced pressure (12 mm. Hg) at 30–60° C., the tetrahydrofuran is evaporated and the 1,2,4,5-tetrahydroxybenzene (III) is left as a white powder. The yield of 1,2,4,5-tetrahydroxybenzene (III) is between 70 and 90 percent. It is almost not affected by the amount of catalyst used, which amount therefore can be kept very low (0.15 percent or less of the weight of the quinone reduced). With 70 parts of the catalyst a total of 67,700 parts of quinone (II) was hydrogenated in four consecutive runs. In large runs the crystallization of the product occurred in different steps. Thus, it may be necessary to rehydrogenate the solution after two crystallizations if the color turns orange again, probably due to some oxidation of the dissolved 1,2,4,5-tetrahydroxybenzene (III) during the work up. In cases where no pure crystals were obtained they easily were recrystallized from tetrahydrofuran in very high yield.

The best mode of carrying out the invention is set forth in the following examples:

EXAMPLE I

Preparation of starting material

In a two liter, three necked flask are mixed a concentrated sodium hydroxide solution (50 percent, 800 ml., 10 moles) and finely divided hydroquinone (I, 110 g., 1 mole). This mixture is heated to 50° C. in a thermostated bath under rapid and effective stirring and kept at that temperature during the slow addition of hydrogen peroxide. (400 ml. of a 30 percent solution, 3.5 moles). The addition requires six and a half hours.

Thereafter stirring is continued for 1½ hours. After cooling, the brown viscous mixture is poured over cracked ice (1000 g.) and acidified with ice cold hydrogen chloride solution (900 ml. of a 36 percent solution of HCl added to 1000 g. of cracked ice). A yellow precipitate is formed and is filtered off or centrifuged at low temperature. The solid is washed with some distilled water and dried in a desiccator over calcium chloride, solid sodium hydroxide or phosphorus pentoxide. When dry the solid weighs 146.7 g. Then it is dissolved in a large amount (5 to 6 l.) of acetone or tetrahydrofuran (THF) in order to precipitate some sodium chloride (29.3 g.). This THF solution can be used for the subsequent hydrogenation. After evaporation of the solvent, the residual yellow solid is pure 2,5-dihydroxy-1,4-benzoquinone, (XIV, 117.4 g., yield 83.8 percent) of M.P. 215–216° C. (lit.: 212–214° C.).

Analysis of II, $C_6H_4O_4$ (mol. weight: 140).—Found (percent): C, 51.40; H, 2.88. Calcd. (percent): C, 51.43; H, 2.86.

EXAMPLE II

Preparation of final product

Catalytic hydrogenation of 2,5-dihydroxy-1,4-benzoquinone (II): In a four liter, three necked flask, equipped with a sealed stirrer, a gas inlet and a dropping funnel, are placed tetrahydrofuran (THF, 200 ml.) and platinum oxide ($PtO_2$, 70 mg.). The gas inlet is connected to a gas burette containing hydrogen gas and the flask is flushed with hydrogen. The stirrer is started and the catalyst is prehydrogenated until no more hydrogen uptake is observed. Then a solution of 2,5-dihydroxy-1,4-benzoquinone (II, 50 g. 0.357 mole) in THF (3 l.) is added and the solution is allowed to take up hydrogen for about four hours. The calculated volume of hydrogen is 7.99 l. The color changes from brown to orange to faintly yellow. When the absorption becomes very slow, the stirrer is stopped and the catalyst is allowed to settle. Next, the solution is decanted from the catalyst under a hydrogen atmosphere. Half of the solvent is distilled off at atmospheric pressure under dry nitrogen and the solution is cooled in a well closed flask. After one day, large shaped crystals (70 to 85 g.) are formed and are filtered off preferably under a nitrogen atmosphere in a glove box. These crystals are heated in a 250 ml. flask under reduced pressure (12 mm. Hg) at 30–60° C. After one or two hours they change into a white powder which is pure 1,2,4,5, tetrahydroxybenzene (III, 34.5 g., 68 percent, M.P. 215° C. with decomposition). From the filtrate a second crop of less pure crystals (13 to 16 g.) can be obtained by further reducing the amount of solvent. After heating under reduced pressure, they give 1,2,4,5-tetrahydroxybenzene (III, 6.6 g., 13 percent, M.P. 215° C., with decomposition) as a slightly brownish powder. Then the resulting filtrate is rehydrogenated to as clear a color as possible. By repeating the crystallization and heating procedures as above, a third portion (8.3 g., 16.4 percent, M.P. 215 with decomposition) of 1,2,4,5-tetrahydroxybenzene (III) is obtained as a light brown powder.

The unobvious and unpredictable nature of the present invention is highlighted by the following tabulation which is a comparison of the results, including yields, obtained with the invention and with prior art methods.

| Run | Procedure | Product | Yield, percent (weight) |
|---|---|---|---|
| A | 5 g. (0.036 mole) II, 2 g. RaNi, 200 ml. EtOH, 1 atm | Dark brown to black solid | 60 |
| B | 2.2 g. (0.016 mole) II, 1 g. RaNi, 100 ml. EtOH, 3.5 atm., 50° C.[1] | Purple solid | 73 |
| C | 2.2 g. (0.016 mole) II, 1 g. RaNi, 100 ml. EtOH, 3.5 atm., 2 hrs. at 100° C., 4 hrs. at 150° C., workup under $SO_2$ atm.[1] | Black oily semi-solid | |
| D | 0.3 g. (0.002 mole) II, 0.015 g. $PtO_2$, 100 ml. MeOH, 1 atm.[2] | 1,2,4,5,-tetrahydroxybenzene (III) grey powder, M.P. 205–208° C. (from HOAC) | 29.1 |
| E | 2.5 g. (0.018 mole) II, 0.125 g. $PtO_2$, 200 ml. MeOH, 1 atm.[3] | III, grey white powder, 204–206° C | 65 |
| F | do | III, grey powder,[3] M.P. 200° C. (decomp.) | 79 |
| G | 5 g. (0.036 mole) II, 0.125 g. $PtO_2$, 200 ml. MeOH, 1 atm.[2] | III, grey powder, M.P. 215–230° C. (decomp.)[4] | 66 |
| H | 2 g. (0.014 mole) II, 0.125 g. $PtO_2$, 270 ml. THF, 1 atm. Product crystallized on evaporating half of the solvent. | III, white powder, M.P. 215–232° C. (decomp.) | 70.5 |
| I | 6.75 g. (0.045 mole) II, 0.1 g. $PtO_2$, 325 ml. THF, 1 atm | III, white powder | 72 |
| J | 6 g. (0.043 mole) II, 0.075 g. $PtO_2$, 300 ml. THF[5], 1 atm | do | 73.9 |
| K | 6 g. (0.043 mole) II, 0.075 g. $PtO_2$, 300 ml. THF, 1 atm | do | 90.5 |
| L | 49.7 g. (0.35 mole) II, 0.07 g. $PtO_2$, 3 l. THF, 1 atm | White powder 220–240° C. (decomp.) | a 74.5 |
| | do | Impure III | 2.9 |
| M | 50 g. (0.36 mole) II, 0.07 g. $PtO_2$[6], 3 l. THF, 1 atm | III, white powder | 68 |
| | do | III, slightly brownish powder | 13 |
| | do | III, slightly brownish powder [7] | 16.4 |
| N | 53.4 g. (0.38 mole) II, 0.07 g. $PtO_2$[8], 2 l. THF | III, white powder | 57.5 |
| | do | III, brownish crystals [8] | 13 |
| O | 83.2 g. (0.59 mole) II, 0.07 g. $PtO_2$, 2 l. THF.[9], 1 atm | III, white powder [10] | 41 |
| | do | III, slightly grey | 14.8 |
| | do | III, slightly pink | 17.4 |
| P | 112.5 g. (0.80 mole) 2,5-dihydroxy-1,4-benzoquinone (II), 70 mg. $PtO_2$, 2,400 ml. THF/MeOH (10/1; v./v.) | III, white powder, M.P. 225–240° C | 61.8 |
| | do | III, white powder | 13.0 |
| | do | III, brownish product | 5.3 |
| Q[11] | 127.7 g. (0.91 mole) II, 70 mg. $PtO_2$, 2,260 ml. THF/MeOH (10/1; v./v.) | III, white powder | 59.6 |
| | do | do | 19.4 |
| R[11] | 129.2 g. (0.92 mole) II, 70 mg. $PtO_2$, 2,050 ml. THF/MeOH (10/1; v./v.) | do | 57.2 |
| | do | III, very slightly brownish powder | 17.2 |
| S[11] | 184.5 g. (1.32 mole) II, 70 mg. $PtO_2$, 3,250 ml. THF/MeOH (10/1; v./v.) | III, white powder | 61.2 |
| | do | III, nearly white powder | 17.7 |
| T[11] | 159.0 g. (1.21 mole) II, 70 mg. $PtO_2$, 2,250 ml. THF/MeOH (10/1; v./v.) | III, white powder | 69.2 |

See footnotes at end of table.

TABLE—Continued

| Run | Procedure | Product | Yield, percent (weight) |
|---|---|---|---|
| U[11] | 77.3 g. (0.55 mole)II, 70 mg. PtO$_2$, 1,250 ml. THF/MeOH (10/1; v./v.) | III, white powder | 64.0 |
|  | ....do.... | III, slightly brownish solid | 14.1 |
| V | 98.3 g. (0.70 mole)II, 145 mg. PtO$_2$, 1,720 ml. THF/MeOH (10/1; v./v.) | III, white powder, M.P. 215–238° C | 67.7 |
|  | ....do.... | III, white powder | 12.7 |
| W | 15 g. (0.11 mole)II, 70 mg. PtO$_2$, 250 ml. H$_2$O | Black solid[12] | .... |
|  | The hydrogen uptake can be started again by the addition of 25 ml. of THF.[13] | III, brownish powder | 30 |
|  | ....do.... | ....do.... | 14.5 |

[1] A small stainless steel autoclave was used. After reaction, when the autoclave was opened a characteristic smell of acetaldehyde was observed.
[2] J. Pospisil and V. Ettel, Coll. Czech. Chem. Comm. 24, 729(1959); Chem. Listy 52, 939 (1958).
[3] Small black solid particles present in the product after evaporation of the solvent were removed by dissolving the product in the smallest possible volume of MeOH. The small black particles did not dissolve.
[4] The M.P. given is after recrystallization from THF.
[5] In this run the THF used was recovered from former runs by simple distillation. The reduction was very slow: four days were required to take up 1.025 ml. of H$_2$. Usually the H$_2$-uptake was complete in four to five hours.
[6] The same batch of catalyst was used as in run L. The catalyst was stored under a small volume of THF and under an atmosphere of H$_2$ in a closed flask.
[7] The third crop of crystals was obtained only after rehydrogenation of the mother liquor of the second crop.
[8] After two crops the solution was evaporated to dryness giving a brown solid residue. It dissolved only partially in Et$_2$O; a black solid remained.
[9] This THF contained about 100 ml. of H$_2$O.
[10] Crystallization occurred only after reducing the volume of the solution to 300 ml. Brownish crystals were obtained. They were recrystallized from THF giving white crystals.
[11] In runs Q to U the same batch (70 mg.) of PtO$_2$ was used. From the combined mother liquors of runs Q to U only 15.7 g. pure product could be recovered. Summarizing runs Q to U a total 677.7 g. quinone (II) was reduced to give 543.2 g. (79%) THB (III) using 11 l THF: MeOH (10:1) and 70 mg. of PtO$_2$.
[12] This black solid presumably is the quinhydrone from II and III. The hydrogen uptake stopped at 77% of theory.
[13] Hydrogen uptake: 62% of theory.
[a] Analysis of III, C$_6$H$_8$O$_4$ (molecular weight, 142): Found (percent): C, 50.66; H, 4.19. Required (percent) C, 50.77; H, 4.23.

The combination of Raney nickel with an alcohol solvent is not satisfactory. Replacement of the nickel by PtO$_2$ is still not the answer since where this was done in runs B to G the product was grey and had variable melting points. With the combination of PtO$_2$ catalyst and THF solvent according to the invention, it is seen in runs H to O that the major part of the product was white in each instance. The yields also were better.

While the present process has been illustrated mainly with reference to the preparation of 1,2,4,5-tetrahydroxybenzene, it will be understood that the same is applicable also to the synthesis of analogous compounds having in the 3- and 6-positions, various noninterfering substituents such as alkyl, halogen, aryl, amino, alkoxy, alkylamino, alkylthio.

What is claimed is:

1. A method for preparing a compound of the formula:

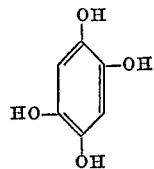

which comprises hydrogenating in the absence of air in a solution consisting of tetrahydrofuran or of a mixture of tetrahydrofuran and up to 10 percent of methanol in the presence of at least 0.01 percent of starting compound of a hydrogenation catalyst a compound of the formula:

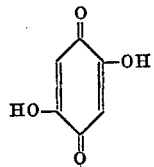

and recovering the desired product by heating the crystals thus formed under reduced pressure at a temperature of 30 to 60° C.

2. The method according to claim 1 wherein the solution is separated from the catalyst under a hydrogen atmosphere.

3. The method according to claim 1 wherein the product is recovered by distilling about one half of the solvent in the absence of air, allowing the remainder to cool also in the absence of air, separating crystals present in said remainder and heating said crystals under reduced pressure.

4. The method according to claim 1 wherein said catalyst is selected from the group consisting of platinum oxide, noble metals and nickel.

References Cited

UNITED STATES PATENTS 2,006,324   6/1935   Schumacher ____ 260—621 H X

OTHER REFERENCES

Neunhoeffer et al., "Berichte," vol. 72, pp. 433–9 (1939).

Pospisil et al., "Coll. Czech. Chem. Comm.," vol. 24, p. 729 (1959).

Berlstein, "Organische Chemie," vol. VI, III suppl., p. 6655 (1949).

BERNARD HELFIN, Primary Examiner

N. MORGENSTERN, Assistant Examiner

U.S. Cl. X.R.

260—396 R